July 5, 1960     J. R. COFFING     2,943,597
GROUND ELEVATION INDICATOR DIAL FOR AIRCRAFT ALTIMETER
Filed April 14, 1958
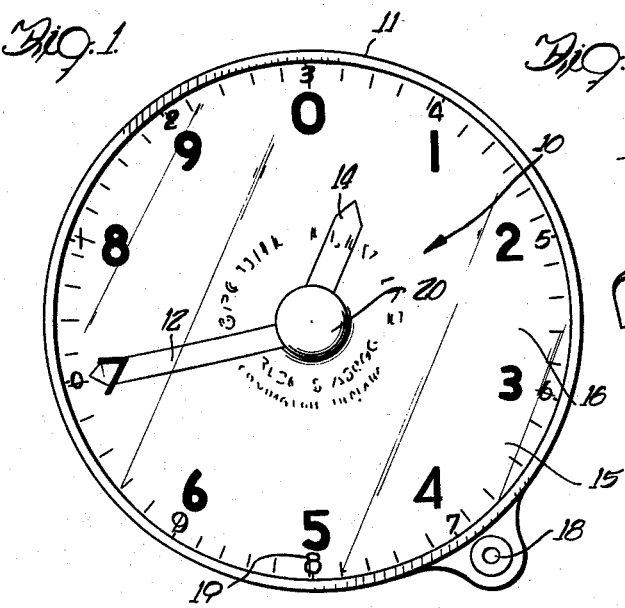
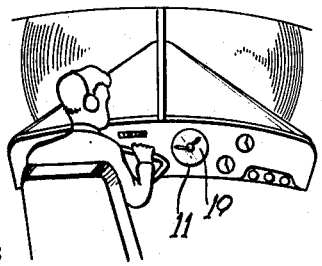
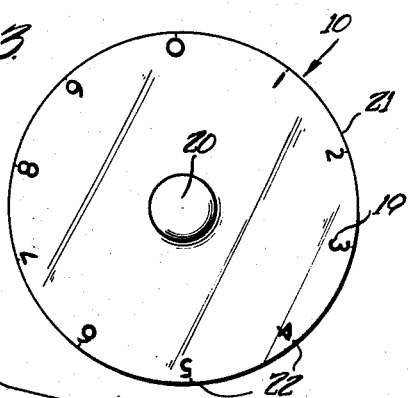
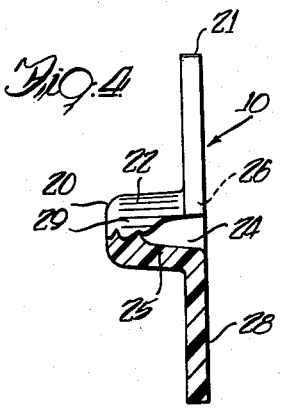
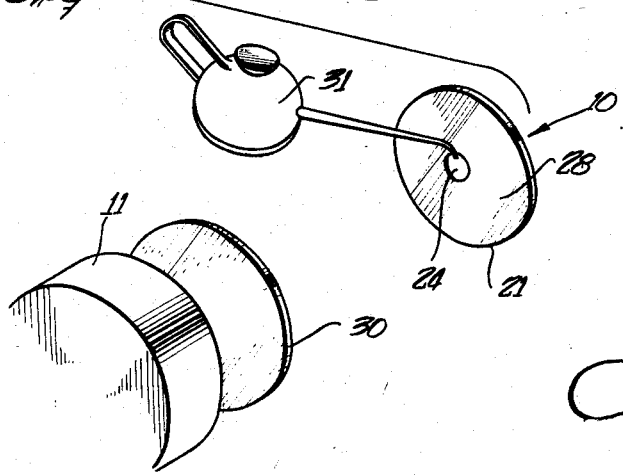
Inventor
James R. Coffing
Jack Clonninck
Attorney

United States Patent Office 2,943,597
Patented July 5, 1960

2,943,597
GROUND ELEVATION INDICATOR DIAL FOR AIRCRAFT ALTIMETER

James R. Coffing, R.R. 2, Box 158D, Covington, Ind.

Filed Apr. 14, 1958, Ser. No. 728,298

8 Claims. (Cl. 116—131)

The present invention relates to aviation instrumentation, and more particularly to a combination including a sensitive altimeter which will read directly the altitude above a preselected station while the sensitive altimeter reads the altitude above sea level.

The majority of the small aircraft today employ sensitive altimeters with two hands which read the altitude above sea level in thousands and hundreds of feet. Since the altimeter is an instrument which relies upon air pressure for its control, the altimeter can be set to adjust for varying air pressures at the nearest surface station. All surface stations where weather reports are given report an altimeter setting, which when set on the altimeter while in flight, will give a reading of the altitude of the aircraft above sea level. In addition, while flying under instrument conditions when the ground cannot be seen, all altitude clearances, minimum altitude requirements, and the like, are measured from sea level.

On the other hand, practically none of the airports where the aircraft intends landing will be at sea level. Therefore, when the pilot seeks to conform to a precise pattern for landing, he must convert mentally from the reading on the altimeter related to sea level to determine his height above ground.

It is the general object of the present invention to provide a ground elevation indicator for a sensitive altimeter so that the pilot can read directly his altitude above the ground.

A more specific object of the invention is to furnish a ground elevation indicator which can be readily attached to the existing sensitive altimeter without the use of any special tools, and which is removable without permanent disfigurement to the altimeter.

Still another object of the invention lies in its aim to reduce any parallax error to the irreducible minimum.

A further object of the invention is to provide a ground elevation indicator susceptible of formation from a single piece of material thereby holding its manufacturing cost to a minimum.

Still another object of the invention is to provide a ground elevation indicator with a fluid seal attachment to its associated altimeter, and also furnish a fluid reservoir to insure a long-term attachment.

Further objects and advantages of the present invention will become apparent as the following description of an illustrative embodiment proceeds, taken in conjunction with the accompanying drawings, in which:

Figure 1 is a front elevation of a ground elevation indicator in a place on its associated sensitive altimeter.

Fig. 2 is a partial view of the interior of a small plane cockpit, illustrating a typical installation of the ground elevation indicator and sensitive altimeter.

Fig. 3 is a front elevation of the ground elevation indicator.

Fig. 4 is an end view in partial section of the ground elevation indicator shown in Fig. 3.

Fig. 5 is an exploded, partially diagrammatic perspective view illustrating the intended assembled relationship of the ground elevation indicator and its associated sensitive altimeter.

The illustrative ground elevation indicator 10 which will be described in detail hereinafter, is used with an aircraft sensitive altimeter 11. The unique nature and beneficial operation of the ground elevation indicator will be best understood with a brief outline of the sensitive altimeter. Referring to Figure 1, it will be seen that the sensitive altimeter 11 has a long hand 12 and a short hand 14. The dial face 15 of the sensitive altimeter has the digits spaced clockwise from 1 through 10, with a zero standing for 10 at the top location. The sensitive altimeter digits are on 36° spacing.

In the present illustration, the altimeter registers 700 feet with the large hand 12. In the event the aircraft is on the ground, and the elevation of the airport is 700 feet, the large hand 12 will read 700 feet at a normal setting. An adjustment window 16 and adjustment knob 18 are provided so that the altimeter can be adjusted to compensate for varying atmospheric pressures since the altimeter is basically an aneroid barometer calibrated to altitude. The small hand 14 reads the thousands of feet of elevation. Thus, in the position shown in Figure 1, the small hand is slightly beyond halfway between zero and 1.

The ground elevation indicator 10 has peripheral numerical indicia 19 spaced in the same manner as the numerical indicia of the sensitive altimeter. Thus, when the ground elevation indicator 10 is rotated by means of turning its knob 20 (the mechanism for which will be detailed hereinafter), the zero mark can be brought directly opposite the elevation of a selected airport. In the illustration shown in Figure 1, the zero on the ground elevation indicator is opposite the 7. Thus, when the pilot takes off, when he is 400 feet above the airport, the ground elevation indicator will read 4, but the sensitive altimeter will show 1100 feet above sea level. In this manner, the pilot can read directly up to 1000 feet, and further if need be, his altitude above any airport, obstacle, or preselected elevation which he chooses.

Referring now to Figs. 3 and 4, it will be noted that the ground elevation indicator at 10 itself is formed from a single piece of material, preferably a moldable optically clear plastic. Being circular, the diameter of the body portion of the ground elevation indicator is selected to be slightly less than a tangent circle drawn tangent to the numerical indicia on the associated sensitive altimeter 11. The numerical indicia 19 on the ground elevation indicator are recesses and placed closely adjacent the outer edge 21 of the ground elevation indicator 10. It will be noted that the indicia 19 are oriented for horizontal reading only when at the top of the ground elevation indicator through rotation, whereas the numerical indicia on the sensitive altimeter 11 are all oriented for straight-on reading. A plurality of small index marks 22 are provided in the space between the outer edge of the indicia 19 and the outer edge 21 of the ground elevation indicator 10.

The knob 20, as illustrated in Fig. 4, has a knurled external face 22 to provide a ready grip by the pilot when he reaches over to adjust the ground elevation indicator (see Fig. 2). A reservoir 24 is provided inside the knob 22. The reservoir 24 is symmetrical and has tapered side walls 25 which terminate in an end radius 26 at the contact face 28 of the ground elevation indicator. The interior portion of the reservoir 24 terminates in a radius 29.

Fig. 5 illustrates diagrammatically how the ground elevation indicator is attached to the aircraft. The sensitive altimeter 11 has a flat front window 30, normally a thin sheet of glass. An oil can 31, or other dispenser for a heavy oil or glycerin, is employed to deposit a thin film of the viscous fluid material on the flat face 28 of the ground elevation indicator 10, and then fill the reservoir area 24. Naturally, the ground elevation indicator is held horizontally while the reservoir 24 is filled.

The bottom portion of the ground elevation indicator edge 21 is then brought up against the glass window 30 of the sensitive altimeter 11, and the ground elevation indicator 10 is then quickly brought into the vertical position with its flat face 28 against the glass plate 30 of the sensitive altimeter 11. The surface tension created by the film of heavy oil or glycerin at the interface between the glass 30 and the ground elevation indicator flat face 28 holds the two elements in close contact and yet serves as a lubricant when the ground elevation indicator 10 is adjusted by rotating its knob 20.

It will be appreciated that no permanent marks or modifications are required to the sensitive altimeter or its front window 30, and that attachment can be made with a minimum of equipment—really only a supply of oil or glycerin being required. Also, because the numerical indicia 19 on the ground elevation indicator are in close relationship to the numerical indicia on the sensitive altimeter 11, parallax error is held to a very minimum as well. By filling the recessed pattern of the ground elevation indicator indicia 19 with a luminous paint, the ground elevation indicator serves equally as well as a night instrument as its associated sensitive altimeter. The orientation of the ground elevation indicator indicia 19 outside the sensitive altimeter indicia holds any parallax error to the irreducible minimum. The entire construction of the ground elevation indicator 10 is such as to render it susceptible of formation in a single piece from a plastic selected for its optical clarity and flat, smooth surface. Thus, the pilot can be provided with a very accurate, easy to use, easy to install, and inexpensive, aid to his flight.

Although particular embodiments of the invention have been shown and described in full here, there is no intention to thereby limit the invention to the details of such embodiments. On the contrary, the intention is to cover all modifications, alternative embodiments, usages and equivalents of the ground elevation indicator as fall within the spirit and scope of the invention, specification and appended claims.

I claim as my invention:

1. A ground elevation indicator for use with a sensitive aircraft altimeter having elevation indicia disposed circumferentially on a dial and a transparent front window for viewing said elevation indicia, which ground elevation indicator comprises a transparent disc member having inner and outer essentially parallel faces and characterized by an adjustment knob at the center of said outer face and a circular opening in the center of said inner face, said knob defined a fluid reservoir interiorly thereof extending through said disc member to said opening in said inner face, and numerical indicia reading 0 through 9 on 36° spacing disposed circumferentially on one face of said transparent disc member, said disc member being adapted for close contact positioning on said front window of said sensitive altimeter, whereby a film of viscous fluid material deposited in said reservoir and on said inner face will hold said indicator in fluid-seal attachment to the associated sensitive altimeter window and permit rotation to various station elevations on said altimeter to thereby read directly the altitude above the preselected stations.

2. A ground elevation indicator for use with a sensitive aircraft altimeter having one hundred foot elevation indicia disposed circumferentially on a dial and a transparent front window for viewing said elevation indicia, which ground elevation indicator comprises a transparent disc member having inner and outer essentially parallel faces and characterized by an adjustment knob at the center of said outer face and a circular opening in the center of said inner face, said knob defining a fluid reservoir interiorly thereof extending through said disc member to said opening in said inner face, serrations on the periphery of said knob facilitating a firm finger grip, and numerical indicia reading 0 through 9 on 36° spacing disposed circumferentially on one face of said transparent disc member, said disc member being adapted for close contact positioning on said front window of said sensitive altimeter, whereby a film of viscous fluid material deposited in said reservoir and on said inner face will hold said indicator in fluid-seal attachment to the associated sensitive altimeter window and permit rotation to various station elevations on said altimeter to thereby read directly the altitude above the preselected stations.

3. A ground elevation indicator for use with a sensitive aircraft altimeter having elevation indicia disposed circumferentially on a dial and a transparent front window for viewing said elevation indicia, which ground elevation indicator comprises a transparent disc member of optically clear plastic having inner and outer essentially parallel faces and characterized by an adjustment knob at the center of said outer face and a circular opening in the center of said inner face, said knob defining a fluid reservoir interiorly thereof extending through said disc member to said opening in said inner face, said reservoir having inwardly converging walls, and numerical indicia reading 0 through 9 on 36° spacing disposed circumferentially on one face of said transparent disc member, said disc member being adapted for close contact positioning on said front window of said sensitive altimeter, whereby a film of viscous fluid material deposited in said reservoir and on said inner face will hold said indicator in fluid-seal attachment to the associated sensitive altimeter window and permit rotation to various station elevations on said altimeter to thereby read directly the altitude above the preselected stations.

4. The ground elevation indicator of claim 3 wherein said numerical indicia of said disc member are oriented for horizontal reading only when rotated into the 12 o'clock position, whereas the numerical indicia on said sensitive altimeter are all oriented for straight-on reading.

5. A secondary indicator for use with an aircraft instrument having circularly oriented indicia disposed circumferentially on a dial and a transparent front window for viewing said indicia, which secondary indicator comprises a transparent disc member having inner and outer essentially parallel faces and characterized by an adjustment knob at the center of said outer face and a circular opening in the center of said inner face, said knob defining a fluid reservoir interiorly thereof extending through said disc member to said opening in said inner face, and numerical indicia disposed circumferentially on one face of said transparent disc member, said disc member being adapted for close contact positioning on said front window of said aircraft instrument, whereby a film of viscous fluid material deposited in said reservoir and on said inner face will hold said indicator in fluid-seal attachment to the associated aircraft instrument window and permit rotation to various indicia on said aircraft instrument to thereby read correlative data directly on the secondary indicator which is constantly related to the intelligence on the aircraft instrument.

6. A ground elevation indicator for use with a sensitive aircraft altimeter having elevation indicia disposed circumferentially on a dial and a transparent front window for viewing said elevation indicia, which ground elevation indicator comprises a transparent disc member having a diameter less than the diameter of the sensitive altimeter circumferential indicia locus, said disc member having inner and outer essentially parallel faces and characterized by an adjustment knob at the center of said outer face and a circular opening in the center of said inner face, said knob defining a fluid reservoir interiorly thereof extending through said disc member to said opening in said inner face, and numerical indicia reading 0 through 9 on 36° spacing disposed circumferentially on one face of said transparent disc member, said disc member being adapted for close contact positioning on said front window of said sensitive altimeter, whereby a film of viscous fluid material deposited in said reservoir and on said inner face will hold said indicator in fluid-seal attachment to the associated sensitive altimeter window and permit rotation to various station elevations on said altimeter to thereby read directly the altitude above the preselected stations.

7. A ground elevation indicator for use with a sensitive aircraft altimeter having circularly oriented elevation indicia disposed circumferentially on a dial and a transparent front window for viewing said elevation indicia, which ground elevation indicator comprises a transparent disc member having inner and outer essentially parallel faces and characterized by an adjustment knob at the center of said outer face and a circular opening in the center of said inner face, said knob defining a fluid reservoir interiorly thereof extending through said disc member to said opening in said inner face, recessed numerical indicia reading 0 through 9 on 36° spacing disposed circumferentially on said outer face of said transparent disc member, and luminous material filling the base of the recesses of said numerical indicia, said disc member being adapted for close contact positioning on said front window of said sensitive altimeter, whereby a film of viscous fluid material deposited in said reservoir and on said inner face will hold said indicator in fluid-seal attachment to the associated sensitive altimeter window and permit rotation to various station elevations on said altimeter to thereby read directly the altitude above the preselected stations.

8. An aircraft instrument assembly comprising in combination an aircraft instrument having indicia disposed circumferentially on a dial, a transparent front window for viewing said indicia mounted on said instrument, a secondary indicator comprising a transparent disc member having inner and outer essentially parallel faces and characterized by an adjustment knob at the center of said outer face and a circular opening in the center of said inner face, said knob defining a fluid reservoir interiorly thereof extending through said disc member to said opening in said inner face, numerical indicia disposed circumferentially on one face of said transparent disc member, said disc member being adapted for close contact positioning on said front window of said aircraft instrument, and viscous fluid material deposited in said reservoir and in a film on said inner face holding said secondary indicator in fluid-seal attachment to the associated aircraft instrument window, thereby permitting rotation to various indicia on said aircraft instrument to read correlative data directly on the secondary indicator which is constantly related to the intelligence on the aircraft instrument.

References Cited in the file of this patent

UNITED STATES PATENTS

| | | |
|---|---|---|
| 1,456,644 | Meyer | May 29, 1923 |
| 1,530,067 | Young | Mar. 17, 1925 |
| 1,796,652 | Hawley | Mar. 17, 1931 |
| 2,260,541 | Schwenn | Oct. 28, 1941 |
| 2,385,411 | Geer | Sept. 25, 1945 |